(12) United States Patent
Kama et al.

(10) Patent No.: US 10,457,342 B2
(45) Date of Patent: Oct. 29, 2019

(54) TRAVELING APPARATUS

(71) Applicant: TOYOTA JIDOSHA KABUSHIKI KAISHA, Toyota-shi, Aichi-ken (JP)

(72) Inventors: Takeshi Kama, Nagakute (JP); Makoto Kakuchi, Toyota (JP); Makoto Mori, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 291 days.

(21) Appl. No.: 15/590,287

(22) Filed: May 9, 2017

(65) Prior Publication Data
US 2018/0009489 A1 Jan. 11, 2018

(30) Foreign Application Priority Data
Jul. 8, 2016 (JP) .................................. 2016-136026

(51) Int. Cl.
| | | |
|---|---|---|
| B62D 51/02 | (2006.01) | |
| B62D 21/14 | (2006.01) | |
| B62D 51/04 | (2006.01) | |
| B62H 1/02 | (2006.01) | |
| B62K 3/00 | (2006.01) | |

(Continued)

(52) U.S. Cl.
CPC .............. *B62D 51/02* (2013.01); *B62D 21/14* (2013.01); *B62D 51/04* (2013.01); *B62H 1/02* (2013.01); *B62K 3/002* (2013.01); *B62K 5/027* (2013.01); *B60L 3/08* (2013.01); *B60L 15/20* (2013.01); *B60L 2200/24* (2013.01); *B60L 2240/12* (2013.01); *B60L 2250/24* (2013.01); *B60L 2260/26* (2013.01); *B62K 5/00* (2013.01);

(Continued)

(58) Field of Classification Search
None
See application file for complete search history.

(56) References Cited

U.S. PATENT DOCUMENTS

2008/0116665 A1 * 5/2008 Nakaizumi ............ B62D 21/14
280/638
2008/0295595 A1 12/2008 Tacklind et al.
(Continued)

FOREIGN PATENT DOCUMENTS

DE 19738694 A1 * 3/1999 ............ B60R 5/042
DE 10039302 A1 * 2/2002 ............ B62D 21/14
(Continued)

*Primary Examiner* — David P. Merlino
(74) *Attorney, Agent, or Firm* — Oliff PLC

(57) ABSTRACT

Provided is a traveling apparatus including at least, with respect to a traveling direction, a front wheel and a rear wheel and on which a user rides when travelling. The traveling apparatus includes a front wheel supporting member configured to rotatably support the front wheel, a rear wheel supporting member configured to rotatably support the rear wheel, an adjusting mechanism configured to adjust a wheel base length between the front wheel and the rear wheel by changing a relative position of the front wheel supporting member and the rear wheel supporting member, and a driving unit configured to drive at least one of the front wheel and rear wheel. The wheel base length adjusted by the adjusting mechanism is associated with a speed of the traveling apparatus achieved by driving the driving unit in such a way that the longer the wheel base length, the greater the speed becomes.

8 Claims, 16 Drawing Sheets

(51) Int. Cl.
*B62K 5/027* (2013.01)
*B60L 3/08* (2006.01)
*B60L 15/20* (2006.01)
*B62K 5/00* (2013.01)
*B62K 15/00* (2006.01)

(52) U.S. Cl.
CPC ........ *B62K 15/006* (2013.01); *B62K 2204/00* (2013.01); *Y02T 10/7258* (2013.01)

(56) References Cited

U.S. PATENT DOCUMENTS

2012/0101703 A1    4/2012   Morita
2014/0262578 A1*   9/2014   Calley ................. B62D 61/065
                                                                           180/210

FOREIGN PATENT DOCUMENTS

| GB | 2433236 A | 6/2007 |
| JP | H01-106717 A | 4/1989 |
| JP | 2005-112300 A | 4/2005 |
| JP | 2005-231415 A | 9/2005 |
| JP | 2010-167809 A | 8/2010 |
| JP | 2012-076671 A | 4/2012 |
| JP | 5316640 B2 | 10/2013 |

\* cited by examiner

| ROTATION ANGLE $\theta$ (DEGREE) | $\theta_{MIN}-\theta_1$ | $\theta_1-\theta_2$ | $\theta_2-\theta_3$ | $\theta_3-\theta_{MAX}$ |
|---|---|---|---|---|
| TARGET SPEED (km/h) | 0 | 5.0 | 10.0 | 15.0 |

TRAVELING APPARATUS

CROSS REFERENCE TO RELATED APPLICATIONS

This application is based upon and claims the benefit of priority from Japanese patent application No. 2016-136026, filed on Jul. 8, 2016, the disclosure of which is incorporated herein in its entirety by reference.

BACKGROUND

The present invention relates to a traveling apparatus on which a user rides and that travels.

Nowadays, personal mobility vehicles have been attracting attention. A personal mobility vehicle is often manufactured in a small size in view of maneuverability, which raises a problem that it lacks stability when traveling at a high speed. In order to improve stability of vehicles, including personal mobility vehicles but not limited thereto, vehicles having adjustable wheel base lengths have been suggested (e.g., Japanese Unexamined Patent Application Publication Nos. H1-106717 and 2005-231415).

SUMMARY

When the vehicles with adjustable wheel base lengths, which have heretofore been suggested, travel at a high speed, they firstly extend their wheel base lengths, accept a command for acceleration, and then travel at a high speed. When these vehicles shift to travel at a low speed, they firstly reduce the wheel base lengths, accept a command for deceleration, and then travel at a low speed. There has thus been a problem that an occupant is required to consecutively issue a command for extending or retracting the wheel base length and a command for increasing or reducing the speed to a vehicle, which complicates driving operations.

The present invention has been made to solve such a problem and provides a traveling apparatus that achieves good maneuverability when traveling at a low speed and stability when traveling at a high speed without requiring a user to perform complicated driving operations.

An exemplary aspect of the present invention is a traveling apparatus including at least, with respect to a traveling direction, a front wheel and a rear wheel and on which a user rides when travels. The traveling apparatus includes: a front wheel supporting member configured to rotatably support the front wheel; a rear wheel supporting member configured to rotatably support the rear wheel; an adjusting mechanism configured to adjust a wheel base length between the front wheel and the rear wheel by changing a relative position of the front wheel supporting member and the rear wheel supporting member; and a driving unit configured to drive at least one of the front wheel and rear wheel. The wheel base length adjusted by the adjusting mechanism is associated with a speed of the traveling apparatus achieved by driving the driving unit in such a way that the longer the wheel base length, the greater the speed becomes, and when one of values of the wheel base length and the speed is changed by an operation of the user, the other one of the values is controlled to be a value associated with the changed one of the values.

With such a configuration, the speed and wheel base length of the traveling apparatus can be automatically adjusted in a relationship favorable to each other. Consequently, the user does not have to issue two-phases of commands, a command for increasing or reducing the speed and a command for extending or retracting the wheel base length.

According to the present invention, it is possible to provide a traveling apparatus that can achieve good maneuverability when traveling at a low speed and stability when traveling at a high speed and that does not require a user to perform complicated driving operations.

The above and other objects, features and advantages of the present invention will become more fully understood from the detailed description given hereinbelow and the accompanying drawings which are given by way of illustration only, and thus are not to be considered as limiting the present invention.

DESCRIPTION OF EMBODIMENTS

Hereinafter, although the present invention will be described with reference to exemplary embodiments of the invention, the invention according to claims is not limited to the following exemplary embodiments. Moreover, all the components described in the following exemplary embodiments are not necessarily indispensable for means to solve problems.

Figure 1:
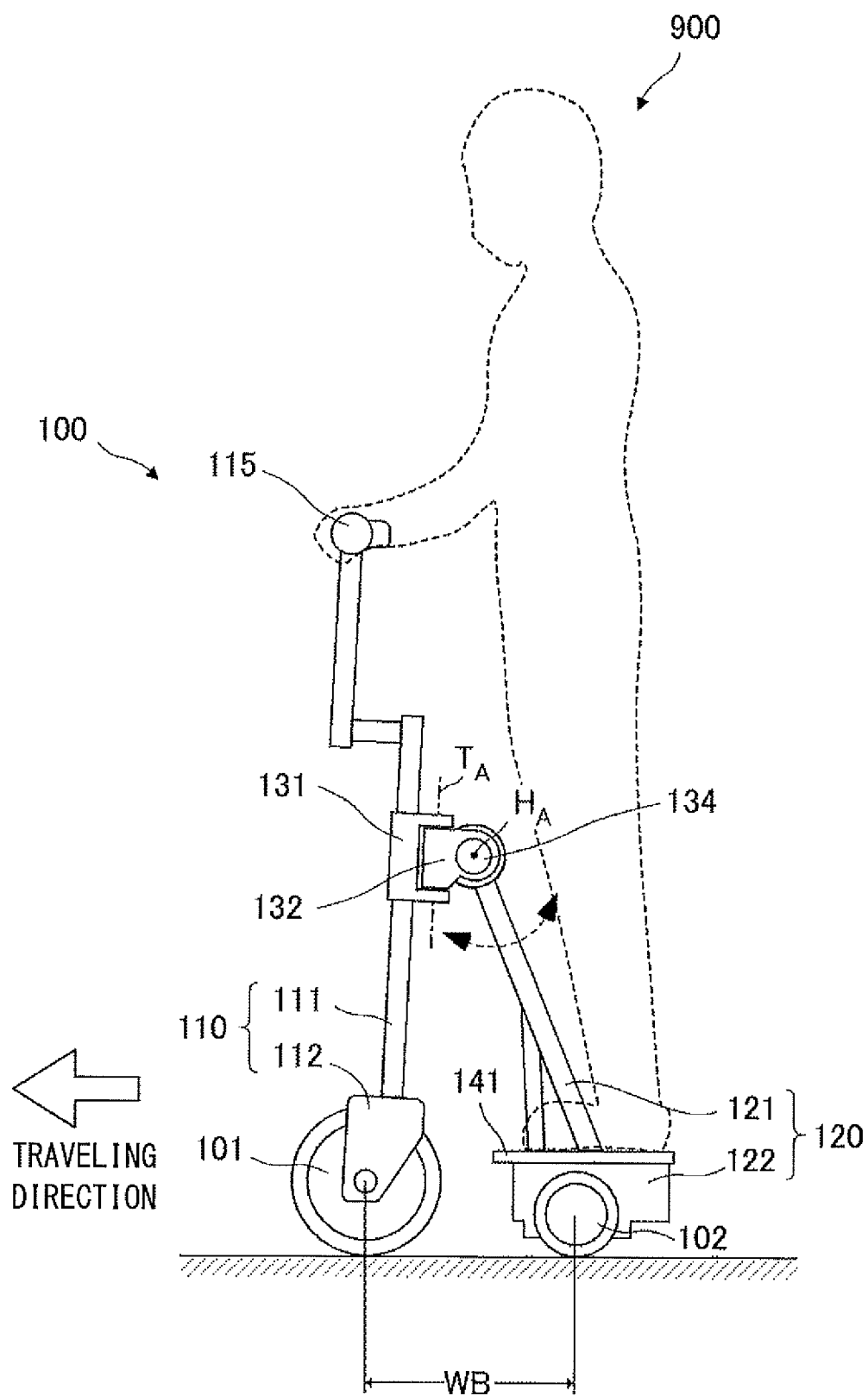
FIG. 1 is a lateral overview diagram of a traveling apparatus according to a first exemplary embodiment when it travels at a low speed.
Figure 2:
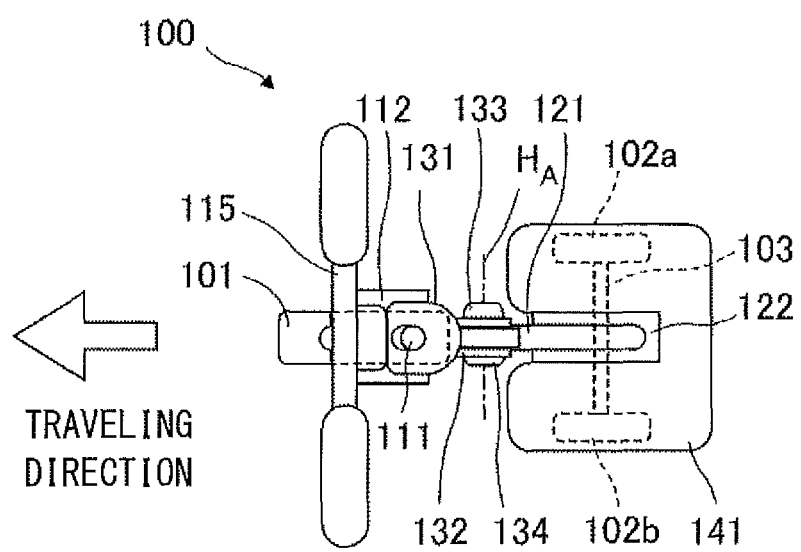
FIG. 2 is a top overview diagram of the traveling apparatus of FIG. 1.

A first exemplary embodiment will be described below. FIG. 1 is a lateral overview diagram of a traveling apparatus 100 according to the first exemplary embodiment when it travels at a low speed. FIG. 2 is a top lateral diagram viewing from above the traveling apparatus 100 that is in the state shown in FIG. 1. In FIG. 2, a user 900, who is illustrated by the dotted line in FIG. 1, is not shown.

The traveling apparatus 100 is one kind of personal mobility vehicle and is an electrically operated mobile vehicle in which a user stands when he or she rides on the traveling apparatus 100. The traveling apparatus 100 includes, with respect to the traveling direction, one front wheel 101 and two rear wheels 102 (right rear wheel 102a and left rear wheel 102b). An orientation of the front wheel 101 is changed when the user 900 operates a handlebar 115. The front wheel 101 functions as a steering wheel. The right rear wheel 102a and left rear wheel 102b are coupled by a wheel axis 103 and driven by a motor and a deceleration mechanism (not shown). The right rear wheel 102a and the left rear wheel 102b function as driving wheels. The traveling apparatus 100 is grounded at three points by the three wheels and is a statically stable vehicle that is self-supported even when the traveling apparatus 100 is parked without the user 900 riding thereon.

The front wheel 101 is rotatably supported by a front wheel supporting member 110. The front wheel supporting member 110 includes a front pole 111 and a fork 112. The fork 112 is fixed to one end of the front pole 111 and sandwiches the front wheel 101 to rotatably support the front wheel 101 on both of its sides. The handlebar 115 is extended in the rotation axis direction of the front wheel 101 and fixed to the other end of the front pole 111. When the user 900 turns the handlebar 115, the front pole 111 transmits a force of the operation to the front wheel 101 to change its orientation.

The rear wheels 102 are rotatably supported by a rear wheel supporting member 120. The rear wheel supporting member 120 includes a rear pole 121 and a body part 122. The body part 122 fixes and supports one end of the rear pole 121 and rotatably supports the right rear wheel 102a and left rear wheel 102b with the wheel axis 103 interposed between the right rear wheel 102a and left rear wheel 102b. The body part 122 also functions as a housing that accommodates the above-mentioned motor and deceleration mechanism, and a battery etc. that supplies power to the motor. A step 141, for the user 900 to place his or her feet on, is provided on the upper surface of the body part 122.

The front wheel supporting member 110 and rear wheel supporting member 120 are coupled to each other with a pivot joint 131 and a hinge joint 132 interposed therebetween. The pivot joint 131 is fixed to the front pole 111 that constitutes the front wheel supporting member 110 at a position near the other end of the front pole 111 to which the handlebar 115 is fixed. Further, the pivot joint 131 is pivotally arranged on the hinge joint 132 and rotates in relation to the hinge joint 132 around a pivot axis $T_A$, which is disposed parallel to the direction in which the front pole 111 is extended. The hinge joint 132 is pivotally arranged on one end of the rear pole 121, which constitutes the rear wheel supporting member 120, that is opposite to an end of the rear pole 121 supported by the body part 122. The hinge joint 132 rotates in relation to the rear pole 121 around a hinge axis $H_A$, which is disposed parallel to the direction in which the wheel axis 103 is extended.

With such a structure, when the user 900 turns the handlebar 115, the front wheel supporting member 110 revolves around the pivot axis $T_A$ with respect to the rear wheel supporting member 120, so that the orientation of the front wheel 101 can be changed. Moreover, when the user 900 tilts the handlebar 115 forward in the traveling direction, the front wheel supporting member 110 and rear wheel supporting member 120 rotate in relation to each other around the hinge axis $H_A$, so that an angle formed by the front pole 111 and rear pole 121 can be made smaller. When the angle formed by the front pole 111 and rear pole 121 is made small, a WB length, which is a distance of a wheel base (WB) between the front wheel 101 and rear wheels 102 will become shorter. On the contrary, when the user 900 tilts the handlebar 115 backward in the traveling direction, the front wheel supporting member 110 and rear wheel supporting member 120 rotate in relation to each other around the hinge axis $H_A$, so that the angle formed by the front pole 111 and rear pole 121 can be made larger. When the angle formed by the front pole 111 and rear pole 121 increases, the WB length increases.

A biasing spring 133 is attached to around the hinge joint 132. The biasing spring 133 exerts a biasing force on the hinge axis $H_A$ in the rotation direction that reduces the angle formed by the front pole 111 and rear pole 121. The biasing spring 133 is, for example, a torsion spring. The biasing force of the biasing spring 133 changes the angle formed by the front pole 111 and rear pole 121 to be structurally the smallest angle when the user 900 is not in contact with the handlebar 115. On the other hand, the biasing force of the biasing spring 133 is configured in such a degree as to enable the user 900 to easily tilt the handlebar 115 backward in the traveling direction. Accordingly, the user 900 can adjust the angle formed by the front pole 111 and rear pole 121 and thus the WB length by changing at least one of a weight on the handlebar 115 and a weight on the step 141.

A rotation angle sensor 134 is attached to around the hinge joint 132. The rotation angle sensor 134 outputs the angle formed by the front pole 111 and rear pole 121 around the hinge axis $H_A$. The rotation angle sensor 134 is, for example, a rotary encoder. An output from the rotation angle sensor 134 is sent to a control unit, which will be described later.

Figure 3:
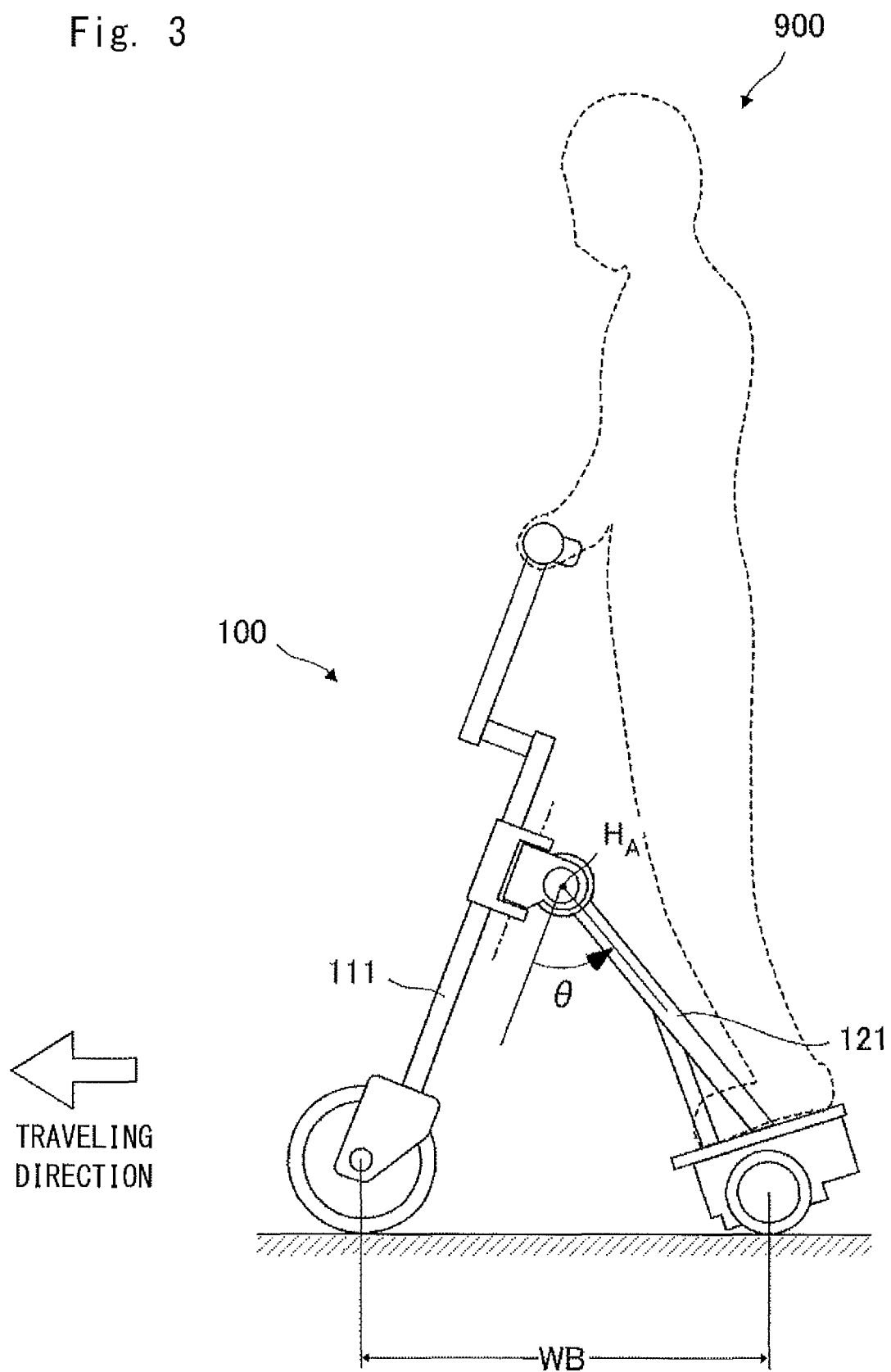
FIG. 3 is a lateral overview diagram of the traveling apparatus of FIG. 1 when it travels at a high speed.

The traveling apparatus 100 travels at a low speed when the WB length is short and travels at a high speed when the WB length is long. FIG. 1 shows a state of the traveling apparatus 100 with a short WB length traveling at a low speed. FIG. 3 is a lateral overview diagram of the traveling apparatus 100 shown in FIG. 1 and shows a state of the traveling apparatus 100 with a long WB length traveling at a high speed.

As shown in the drawings, a direction in which the angle formed by the front pole 111 and rear pole 121 relatively increases shall be positive, and a rotation angle shall be θ. Further, a minimum value the rotation angle θ can take (minimum angle) shall be $\theta_{MIN}$, and a maximum value the rotation angle θ can take (maximum angle) shall be $\theta_{MAX}$. For example, $\theta_{MIN}$ is 10 degrees, and $\theta_{MAX}$ is 80 degrees. In other words, a structural control member is provided so that the rotation angle θ falls within a range between $\theta_{MIN}$ and $\theta_{MAX}$.

The WB length corresponds one-to-one to the rotation angle θ and can be calculated by the function, WB length=f (θ). Therefore, the WB length can be adjusted by changing the rotation angle θ. The traveling apparatus 100 in this exemplary embodiment accelerates when the user 900 increases the rotation angle θ and decelerates when the user 900 reduces the rotation angle θ. That is, the target speed is associated with the rotation angle θ, and a change in the rotation angle θ causes the traveling apparatus 100 to accelerate/decelerate in order to reach the target speed associated with the changed rotation angle θ. In other words, the rotation angle θ is used as a parameter to associate the WB length with the target speed, and when the user 900 adjusts the WB length, the target speed is changed according to the adjusted WB length.

When the rotation angle θ is reduced, the WB length becomes shorter, thereby improving maneuverability. That is, the traveling apparatus 100 can move around in a small space. On the contrary, when the rotation angle θ is increased, the WB length becomes longer, thereby improving travel stability, in particular, straight drivability. That is, the traveling apparatus 100 is less susceptible to sway caused by bumps and the like on the road even when traveling at a high speed. As the WB length is changed in conjunction with a change in the speed, the WB length will not be long when the traveling apparatus 100 is traveling at a low speed, and thus the traveling apparatus 100 can move in a projected area minimal at the low speed. That is, an area on the road necessary for the traveling apparatus 100 to travel in is small without requiring an excess area. This effect is especially pronounced when the traveling apparatus 100 is parked. As the user 900 can change both the speed and WB length in conjunction with each other when he or she tilts the handlebar 115 forward and backward, the driving operation is easy and simple.

Figure 4:
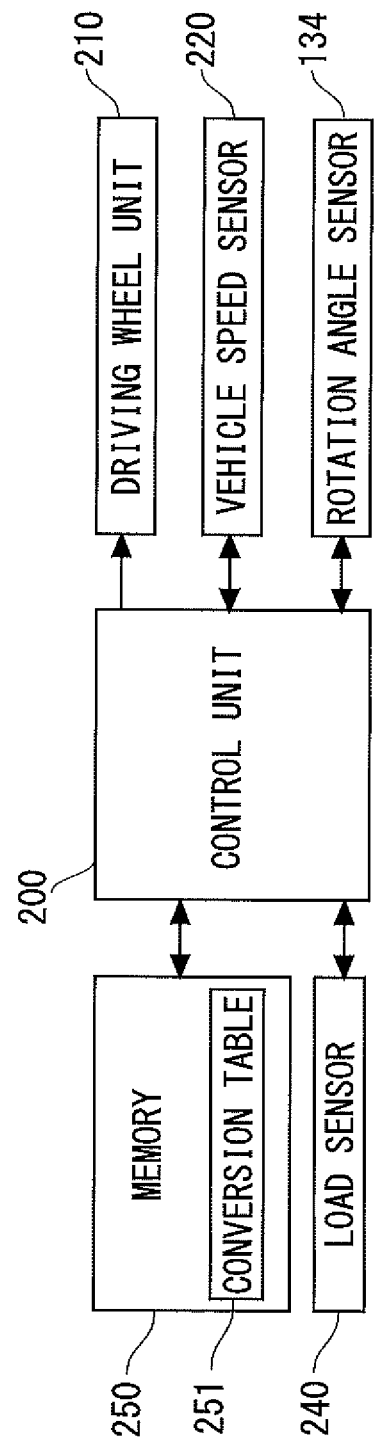
FIG. 4 is a control block diagram of the traveling apparatus according to the first exemplary embodiment.

FIG. 4 is a control block diagram of the traveling apparatus 100. A control unit 200 is, for example, a CPU and accommodated inside the body part 122. A driving wheel unit 210 includes a driving circuit and a motor for driving the rear 102, which are driving wheels. The driving wheel unit 210 is accommodated inside the body part 122. The control unit 200 sends driving signals to the driving wheel unit 210 to thereby control the rotations of the rear wheels 102.

The vehicle speed sensor 220 monitors an amount of the rotation of the rear wheels 102 or wheel axis 103 and detects the speed of the traveling apparatus 100. In response to a request from the control unit 200, the vehicle speed sensor 220 sends a result of the detection in a speed signal to the control unit 200. The rotation angle sensor 134 detects the rotation angle θ in the manner described above. In response to a request from the control unit 200, the rotation angle sensor 134 sends a result of the detection in a rotation angle signal to the control unit 200.

A load sensor 240 is, for example, a piezoelectric film that detects a load applied on the step 141, and is embedded in the step 141.

In response to a request from the control unit 200, the load sensor 240 sends a result of the detection in a load signal to the control unit 200.

A memory 250 is a non-volatile storage medium and is, for example, a solid state drive. The memory 250 stores not only a control program for controlling the traveling apparatus 100 but also various parameter values, functions, lookup tables, and the like used for the control. The memory 250 stores a conversion table 251 for converting a rotation angle into a target speed.

Figures 5, 6:
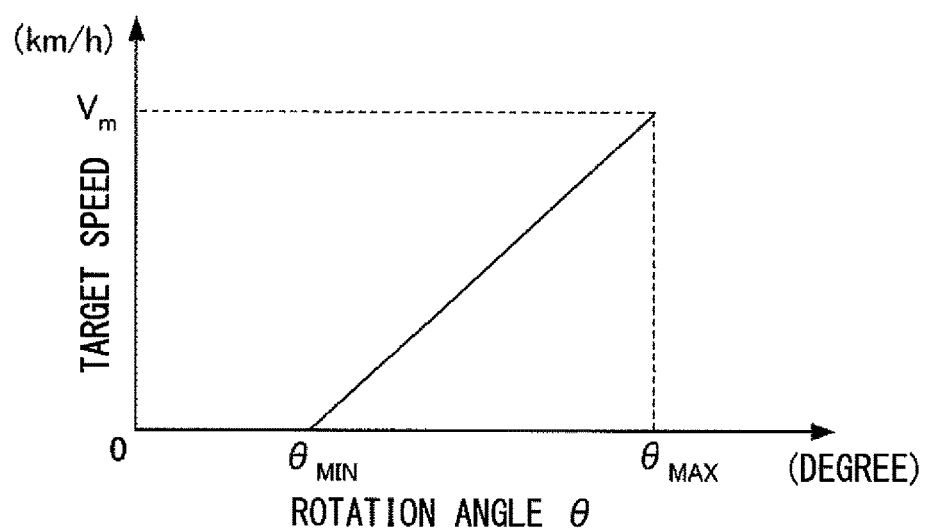
FIG. 5 is a graph showing a relationship between a rotation angle and a target speed.
FIG. 6 is a table showing a relationship between the rotation angle and target speed according to another example.

FIG. 5 is a graph showing a relationship between the rotation angle θ and target speed as an example of the conversion table 251 for converting a rotation angle θ into a target speed. As shown in FIG. 5, the target speed is expressed as a linear function of the rotation angle θ. The target speed is configured to become greater as the rotation angle θ increases. The target speed is zero at the minimum angle $\theta_{MIN}$ (degree), and the target speed is $V_m$(km/h) at the maximum angle $\theta_{MAX}$ (degree). In this way, the conversion table 251 may be in the form of a function.

FIG. 6 is a table showing a relationship between the rotation angle θ and the target speed as another example of the conversion table 251 for converting a rotation angle θ into a target speed. In the example of FIG. 5, the continuously varying target speed is associated with the continuously varying rotation angle θ. In the example of FIG. 6, the continuously varying rotation angle θ is divided into a plurality of groups, and one target speed is associated with each group.

As shown in FIG. 6, the target speed 0 (km/h) is associated with the group of rotation angle θ in the range between $\theta_{MIN}$ or greater and less than $\theta_1$, the target speed 5.0 (km/h) is associated with the group of rotation angle θ in the range between $\theta_1$ or greater and less than $\theta_2$, the target speed 10.0 (km/h) is associated with the group of rotation angle θ in the range between $\theta_2$ or greater and less than $\theta_3$, and the target speed 15.0 (km/h) is associated with the group of rotation angle θ in the range between $\theta_3$ or greater and less than $\theta_{MAX}$. The conversion table 251 in this case can employ the lookup table format. Like in the above example, when the target speed is associated with a somewhat broad range of the rotation angles θ, the target speed will not change little by little, for example, as a result of being affected by swinging of the user 900's body, and it is thus expected that the speed will be smoothly changed. It is obvious that hysteresis may be included in the boundaries between the ranges of the above rotation angles, and by setting different boundaries of the ranges of these angles at the time of acceleration and deceleration, it is expected that the speed will be changed more smoothly.

The association between the rotation angle θ and target speed is not limited to the examples of FIGS. 5 and 6, and various other associations may be formed. As an example of the association, the amount of a change in the target speed for the amount of a change in the rotation angle θ may be configured to be small in a low-speed region, while the amount of a change in the target speed for the amount of a change in the rotation angle θ may be configured to be large in a high-speed region. Moreover, in this exemplary embodiment, although the conversion table 251 for associating the rotation angle θ, which is a parameter, with the target speed because the rotation angle θ corresponds one-to-one to the WB length is employed, a conversion table for associating the WB length with the target speed according to the original purpose of the conversion table may be employed instead. In this case, a rotation angle θ obtained by the rotation angle sensor 134 may be converted into a WB length by using the above function, and the conversion table may be referred to.

Figure 7:
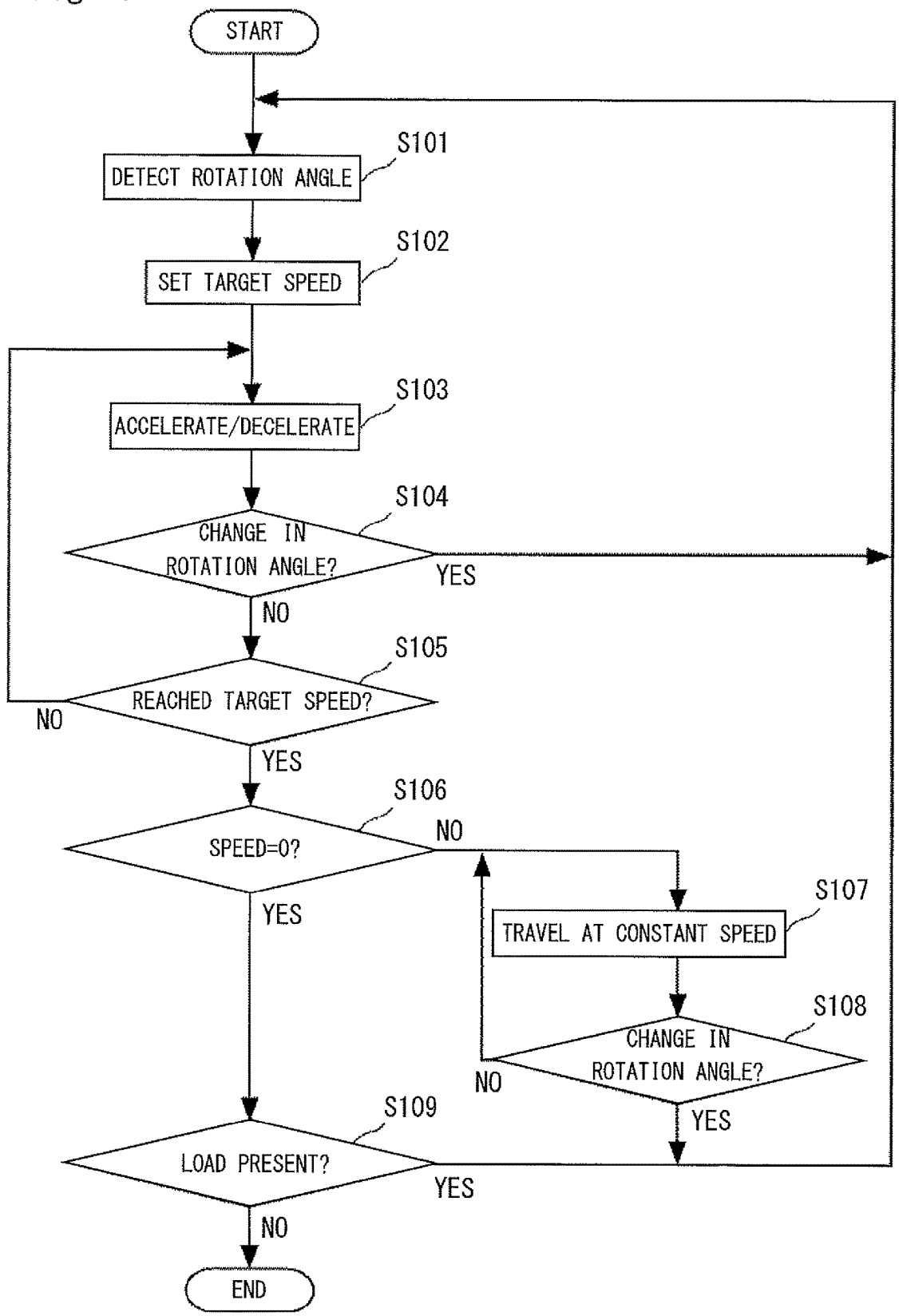
FIG. 7 is a flowchart showing a process while the traveling apparatus is traveling.

Next, a traveling process according to this exemplary embodiment will be described. FIG. 7 is a flowchart showing a process performed while the traveling apparatus 100 is traveling. The flow starts when a power switch is turned on and a signal indicating that a load is present is received from the load sensor 240, i.e., when the user 900 rides on the traveling apparatus 100.

In Step S101, the control unit 200 obtains the rotation angle signal from the rotation angle sensor 134 and calculates the current rotation angle θ. In Step S102, the calculated rotation angle θ is applied to the conversion table 251, which has been read out from the memory 250, to set the target speed.

When the control unit 200 sets the target speed, it proceeds to Step S103 and sends a driving signal for acceleration or deceleration to the driving unit 210. Specifically, the control unit 200 firstly receives the speed signal from the vehicle speed sensor 220 and checks the current speed. If the target speed is greater than the current speed, the control unit 200 sends the driving signal for acceleration to the driving unit 210, whereas if the target speed is less than the current speed, the control unit 200 sends the driving signal for deceleration to the driving unit 210.

The control unit 200 monitors whether or not the rotation angle θ has changed during acceleration or deceleration, that is, whether or not the user 900 has tilted the handlebar 115 forward or backward (Step S104). If the control unit 200 determines that the rotation angle θ has changed, it starts the process from Step S101 again. If the control unit 200 determines that the rotation angle θ has not changed, it proceeds to Step S105. Note that when the conversion table shown in FIG. 6 is employed, if changes in the rotation angle θ are within one range, it is determined that the rotation angle θ has not changed.

In Step S105, the control unit 200 receives the speed signal from the vehicle speed sensor 220 and evaluates as to whether or not the current speed has reached the target speed. If the control unit 200 determines that the current speed has not reached the target speed, it returns to Step S103, and the acceleration or deceleration is continued. If the control unit 200 determines that the current speed has reached the target speed, it proceeds to Step S106. In Step S106, the control unit 200 checks whether or not the target speed is zero. If the target speed is zero, it means that the traveling apparatus 100 is stopped at the time of Step S106. Otherwise, the traveling apparatus 100 is traveling at the target speed, and thus the control unit 200 sends, to the driving wheel unit 210, the driving signal for maintaining the traveling apparatus 100 to travel at the speed (Step S107).

Even while the traveling apparatus 100 is traveling at a constant speed in Step S107, the control unit 200 monitors whether or not the rotation angle θ has changed, that is, whether or not the user 900 has tilted the handlebar 115 forward or backward (Step S108). If the control unit 200 determines that the rotation angle θ has changed, it returns to Step S101. If the control unit 200 determines that the rotation angle θ has not changed, it returns to Step S107 to continue traveling at the constant speed.

If the control unit 200 confirms that the target speed is zero in Step S106, it proceeds to Step S109 and evaluates whether the user 900 gets off the traveling apparatus 100 based on the load signal received from the load sensor 240. If the control unit 200 determines that the user 900 has not got off the traveling apparatus 100, i.e., determines that a load is present, it returns to Step S101 to continue the travel control. If the control unit 200 determines that the user 900 has got off the traveling apparatus 100, a series of operations is ended.

Figure 8:
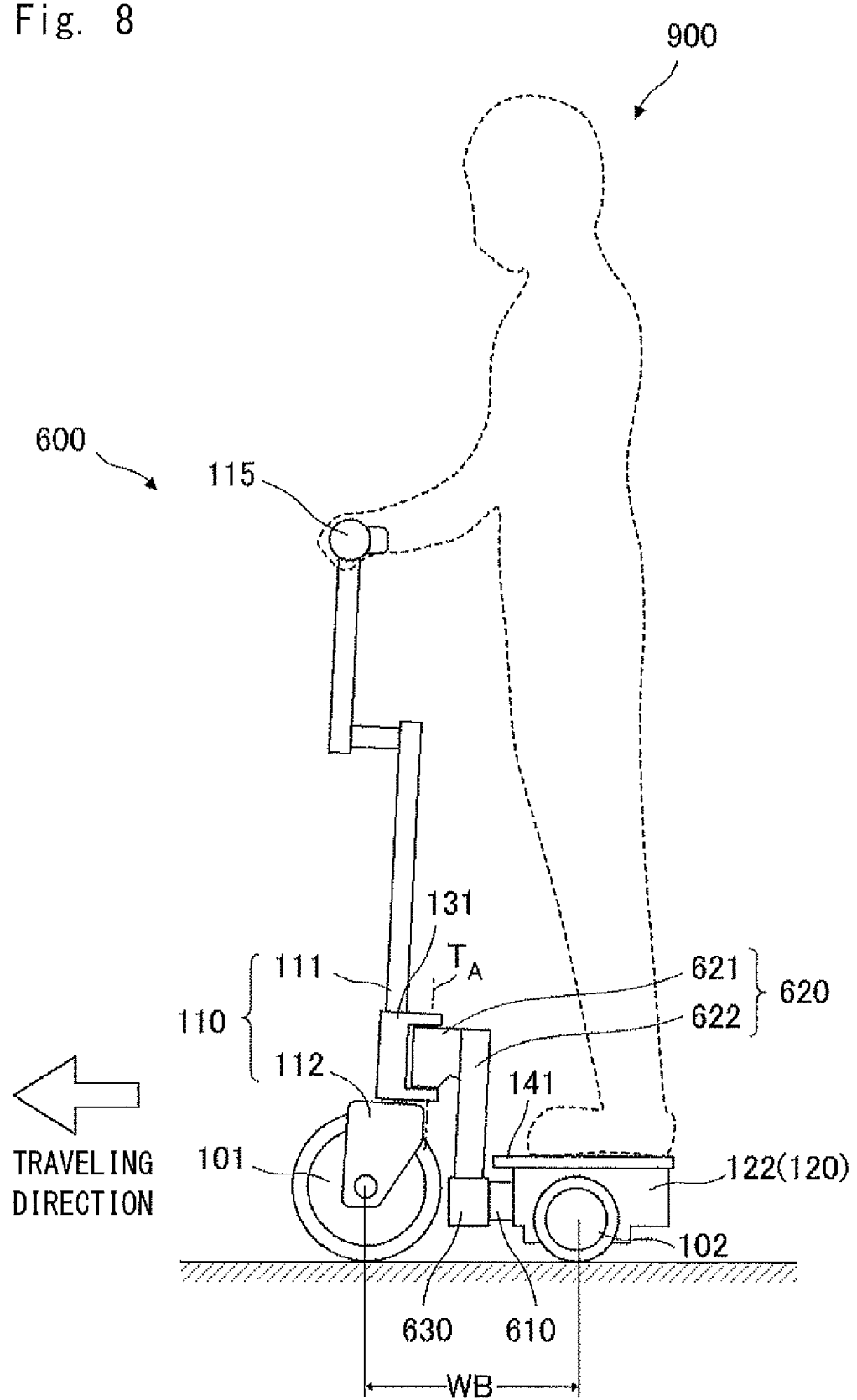
FIG. 8 is a lateral overview diagram of a traveling apparatus according to a second exemplary embodiment when it travels at a low speed.
Figure 9:
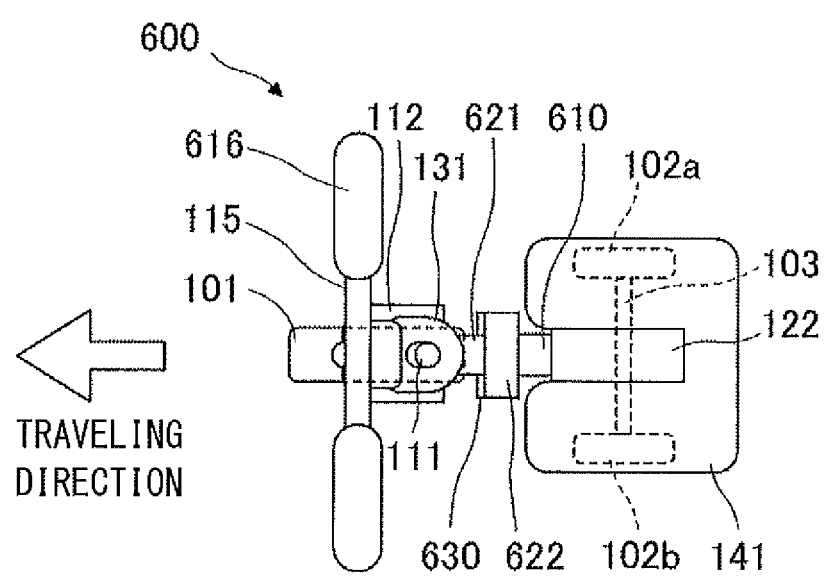
FIG. 9 is a top overview diagram of the traveling apparatus of FIG. 8.

Next, a second exemplary embodiment will be described. FIG. 8 is a lateral overview diagram of a traveling apparatus 600 according to the second exemplary embodiment when it travels at a low speed. FIG. 9 is a top lateral diagram view from above the traveling apparatus 600 that is in the state shown in FIG. 8. In FIG. 9, a user 900, who is illustrated by the dotted line in FIG. 8, is not shown. Like the traveling apparatus 100 of the first exemplary embodiment, the traveling apparatus 600 is one kind of personal mobility vehicle and is a motorized mobile vehicle in which a user stands when he or she rides on the traveling apparatus 600. The elements of the traveling apparatus 600 serving the same function as those of the traveling apparatus 100 are denoted by the same reference signs as those in the first exemplary embodiment. The descriptions of such elements will be thus omitted in this example.

The traveling apparatus 100 of the first exemplary embodiment employs a mechanism in which the front wheel supporting member 110 is connected to the rear wheel supporting member 120 with the hinge joint 132 interposed therebetween in such a way as to rotate the front wheel 101 and rear wheels 102 in relation to each other, as a mechanism to adjust the WB length between the front wheel 101 and rear wheels 102. Further, the user 900 tilts the handlebar 115 forward or backward to exert his or her force in order to adjust the WB length. The traveling apparatus 600 of the second exemplary embodiment employs, as a mechanism to adjust the WB length between the front wheel 101 and rear wheels 102, a mechanism to extend and retract an extensible rod 610, which is disposed between the front wheel supporting member 110 and the body part 122 that serves as a rear wheel supporting member. The extensible rod 610 is extended or retracted when an actuator (not shown) is driven by a control signal from the control unit 200.

The extensible rod 610 is composed of a plurality of hollow coupling rods with diameters different from one another arranged in a nested manner and is structured to displace the coupling rods from the retracted state to the extended state or from the extended state to the retracted state. Thus, the control unit 200 can increase or reduce the WB length in a phased manner according to the number of the coupling rods.

The pivot joint 131 is fixed to the front pole 111 that constitutes the front wheel supporting member 110 at a position near to the other end of the front pole 111 to which the fork 112 is fixed. Moreover, the pivot joint 131 is pivotally arranged on a bearing part 621 that constitute a coupler 620 and rotates around a pivot axis $T_A$ that is disposed parallel to the direction in which the front pole 111 extends in relation to the bearing part 621. The coupler 620 further includes a connecting part 622 in addition to the bearing part 621. The bearing part 621 and connecting part 622 are integrally formed. The connecting part 622 is a pillared member that is extended almost in parallel to the front pole 111 and supports a housing box 630 at an end thereof opposite to the other end thereof where the bearing part 621 is disposed.

The housing box 630 fixes and supports a leading end of the narrowest coupling rod among the coupling rods that constitute the extensible rod 610 and also accommodates the extensible rod 610 in such a way that at least a part of outer peripheral surfaces of the coupling rods, which are nested when they are retracted, are covered. A rear end of the thickest coupling rod among the coupling rods that constitute the extensible rod 610 is fixed to and supported by the body part 122.

In the traveling apparatus 600, a right grip constituting the handlebar 115 is included as an acceleration/deceleration grip 616. The acceleration/deceleration grip 616 can rotate forwardly and backwardly around an axis in a direction in which the handlebar 115 is extended. When the user 900 rotates the acceleration/deceleration grip 616 forward, an acceleration signal is sent to the control unit 200, while when the user 900 rotates the acceleration/deceleration grip 616 backward, a deceleration signal is sent to the control unit 200.

The traveling apparatus 600 receives a command for acceleration and deceleration from the user via the acceleration/deceleration grip 616 and adjusts the speed. Then, the traveling apparatus 600 extends and retracts the extensible rod 610 to adjust the WB length according to the speed. FIG. 8 shows a state when the WB length is made short while the traveling apparatus 600 is traveling at a low speed.

Figure 10:
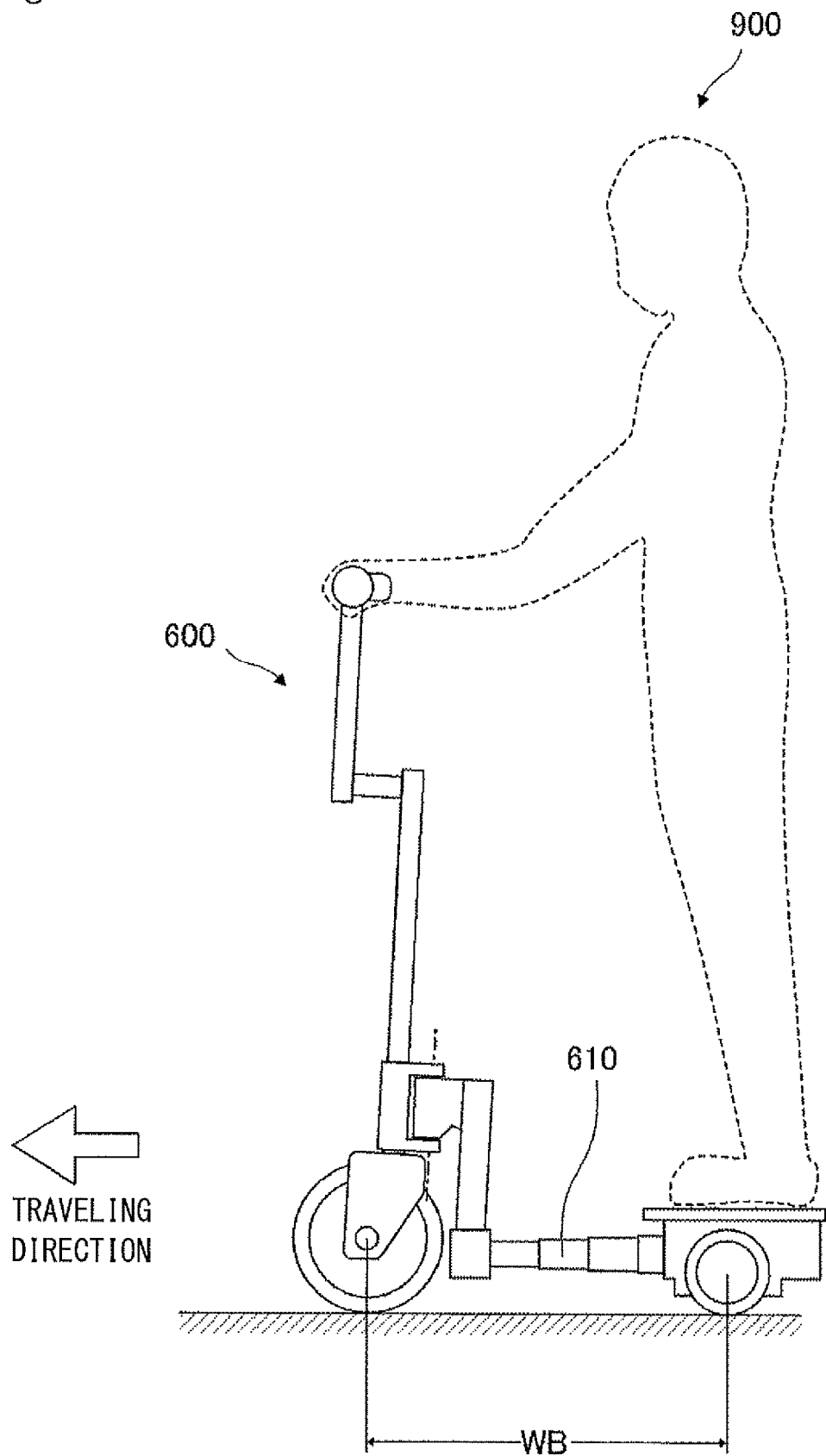
FIG. 10 is a lateral overview diagram of the traveling apparatus of FIG. 8 when it travels at a high speed.

FIG. 10 is a lateral overview diagram of the traveling apparatus 600 shown in FIG. 8 with a long WB length while it is traveling at a high speed.

In this exemplary embodiment, the control unit 200 controls the driving wheel unit 210 in accordance with the command for acceleration/deceleration from the user 900. The control unit 200 firstly changes the speed of the traveling apparatus 600. Next, the control unit 200 extends or retracts the extensible rod 610 according to the changed speed to adjust the WB length. That is, the WB length is associated with the speed, and when the current speed is changed, the extensible rod 610 is extended or retracted so that the WB length will become the one that has been specified for the changed speed. In other words, the traveling apparatus 600 is configured in such a way that when the user 900 changes the speed, the WB length is adjusted according to the changed speed.

With such a configuration, the WB length will become short when the traveling apparatus 600 travels at a low speed, thereby improving maneuverability. That is, the traveling apparatus 600 can move around in a small space. On the contrary, the WB length becomes longer while the traveling apparatus 600 is traveling at a high speed, thereby improving travel stability, in particular, straight drivability. That is, the traveling apparatus 600 is less susceptible to sway caused by bumps and the like on the road even when traveling at a high speed. As the WB length is changed in conjunction with a change in the speed, the WB length will not be long when the traveling apparatus 600 is traveling at a low speed, and thus the traveling apparatus 600 can move in a projected area minimal at the speed. That is, an area on the road necessary for the traveling apparatus 600 to travel in is small without requiring an excess area. This effect is especially pronounced when the traveling apparatus 600 is parked. As the user 900 can change both the speed and WB length in conjunction with each other when he or she rotates the acceleration/deceleration grip 616 forward or backward, the driving operation is easy and simple.

Figure 11:
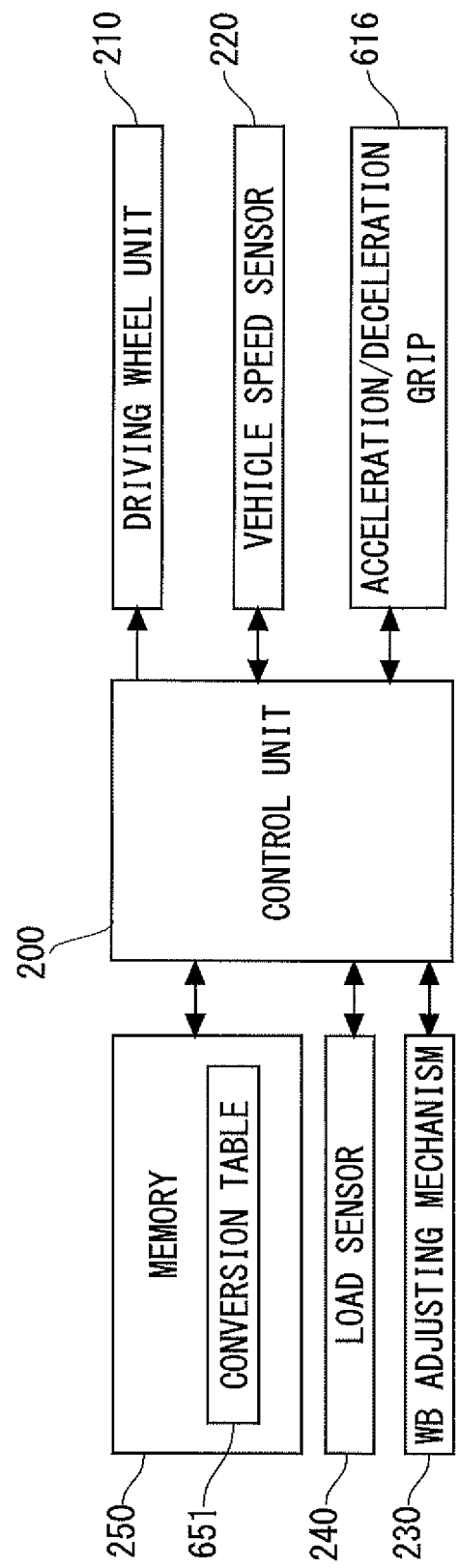
FIG. 11 is a control block diagram of the traveling apparatus according to the second exemplary embodiment.

FIG. 11 is a control block diagram of the traveling apparatus 600 according to the second exemplary embodiment. The elements of the traveling apparatus 600 serving the same function as those of the traveling apparatus 100 are denoted by the same reference signs as those in the first exemplary embodiment. The descriptions of such elements will be thus omitted in this example.

As described above, when the acceleration/deceleration grip 616 detects forward rotation, it sends the acceleration signal to the control unit 200, while when the acceleration/deceleration grip 616 detects backward rotation, it sends the deceleration signal to the control unit 200. The acceleration/deceleration grip 616 may detect an amount of the rotation of the acceleration/deceleration grip 616 to change an amount of acceleration/deceleration per unit time.

A WB adjusting mechanism 230 includes the extensible rod 610 and a driving circuit and an actuator for extending and retracting the extensible rod 610. The control unit 200 sends a driving signal to the WB adjusting mechanism 230 to thereby execute control to extend and retract the extensible rod 610. The memory 250 stores a conversion table 651 for converting the current speed into a corresponding WB length.

Figure 12:
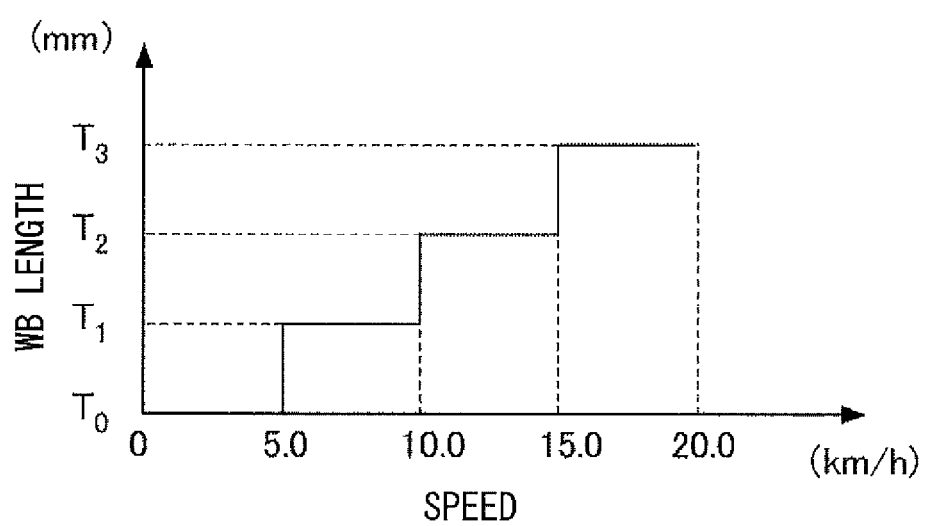
FIG. 12 is a graph showing a relationship between a speed and a wheel base.

FIG. 12 is a graph showing a relationship between the speed and WB length as an example of the conversion table 651 for converting the current speed into a corresponding WB length. As shown in FIG. 12, the WB length is expressed as a step function of the speed. The WB length is configured to be increased in stages as the speed increases. The minimum value of the WB length, $T_0$ (mm), is associated with the range of the speed between zero or greater and less than 5.0 (km/h), the WB length $T_1$ (mm), which is greater than $T_0$, is associated with the range of the speed between 5.0 (km/h) or greater and less than 10.0 (km/h), the WB length $T_2$ (mm), which is greater than $T_1$, is associated with the range of the speed and 10.0 (km/h) or greater and less than 15.0 (km/h), and the longest WB length $T_3$ (mm), is associated with the range of the speed between 15.0 (km/h) or greater and less than 20.0 (km/h). Note that the maximum speed is limited to 20.0 (km/h).

The association between the speed and WB length is not limited to this, and various other associations may be formed. For example, if the extensible rod 610 is configured to be capable of consecutively adjusting its length, a linear function may be used for the association. As another example of the association, the amount of a change in the WB length for the amount of a change in the speed may be configured to be small in a low-speed region, while the amount of a change in the WB length for the amount of a change in the speed may be configured to be large in a high-speed region.

Figure 13:
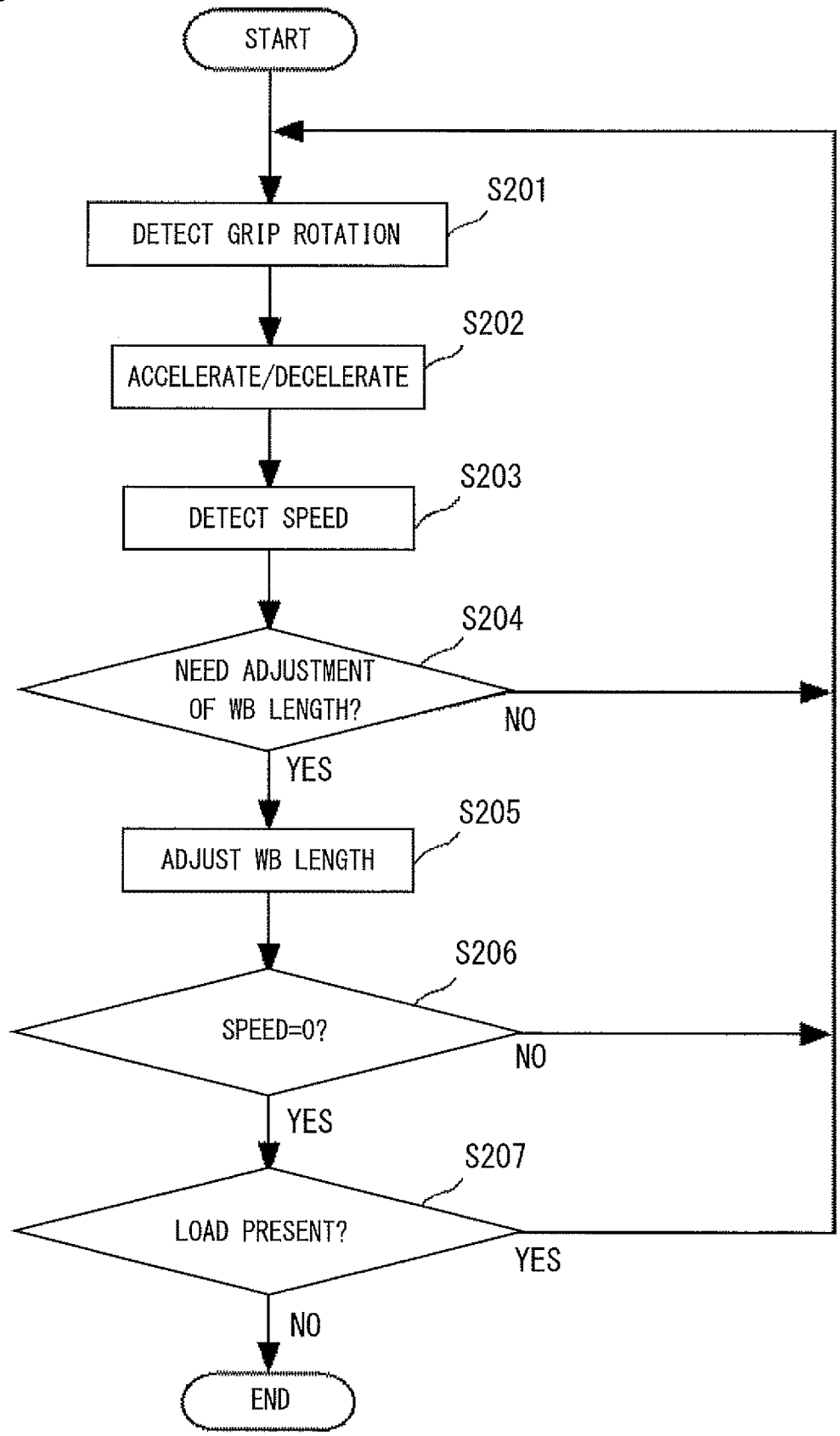
FIG. 13 is a flowchart showing a process while the traveling apparatus is traveling.

Next, a traveling process according to this exemplary embodiment will be described. FIG. 13 is a flowchart showing a process performed while the traveling apparatus 600 is traveling. The flow starts when a power switch is turned on and a signal indicating that a load is present is received from the load sensor 240, i.e., when the user 900 rides on the traveling apparatus 600.

In Step S201, the control unit 200 detects rotation of the acceleration/deceleration grip 616. That is, the control unit 200 receives the acceleration signal or deceleration signal from the acceleration/deceleration grip 616. Then, in Step S202, the control unit 200 sends, to the driving unit 210, a driving signal for acceleration when it received the acceleration signal and sends a driving signal for deceleration when it receives the deceleration signal.

When the control unit 200 starts the process for acceleration or deceleration, it receives the speed signal from the vehicle speed sensor 220 and checks the current speed (Step S203). Next, in Step S204, the control unit 200 applies the checked current speed to the conversion table 651, which has been read from the memory 250, and evaluates as to whether or not it is necessary to adjust the WB length. If the control unit 200 determines that it is not necessary to adjust the WB length, it returns to Step S201. If the control unit 200 determines that it is necessary to adjust the WB length, it proceeds to Step S205.

In Step S205, the control unit 200 sends the driving signal to the WB adjusting mechanism 230 to extend or retract the extensible rod 610 in order to adjust the WB length to the one associated with the current speed. Next, the control unit 200 proceeds to Step S206 and checks as to whether or not the current speed is zero. If the current speed is not zero, the control unit 200 returns to Step S201. If the current speed is zero, the control unit 200 proceeds to Step S207.

In Step S207, the control unit 200 evaluates whether the user 900 gets off the traveling apparatus 600 based on the load signal received from the load sensor 240. If the control unit 200 determines that the user 900 has not got off the traveling apparatus 600, i.e., determines that a load is present, it returns to Step S201 to continue the travel control. If the control unit 200 determines that the user 900 has got off the traveling apparatus 100, a series of operations is ended.

Although the traveling apparatus 600 of the second exemplary embodiment, which has been described so far, employs the acceleration/deceleration grip 616 as an indicator member for the user 900 to instruct the traveling apparatus 600 to accelerate or decelerate, the form of the indicator member is not limited to this. The indicator member may be, for example, a button or a lever. An indicator member for acceleration and an indicator member for deceleration may be separately provided. The indicator member for deceleration may be, for example, a brake lever.

Figure 14:
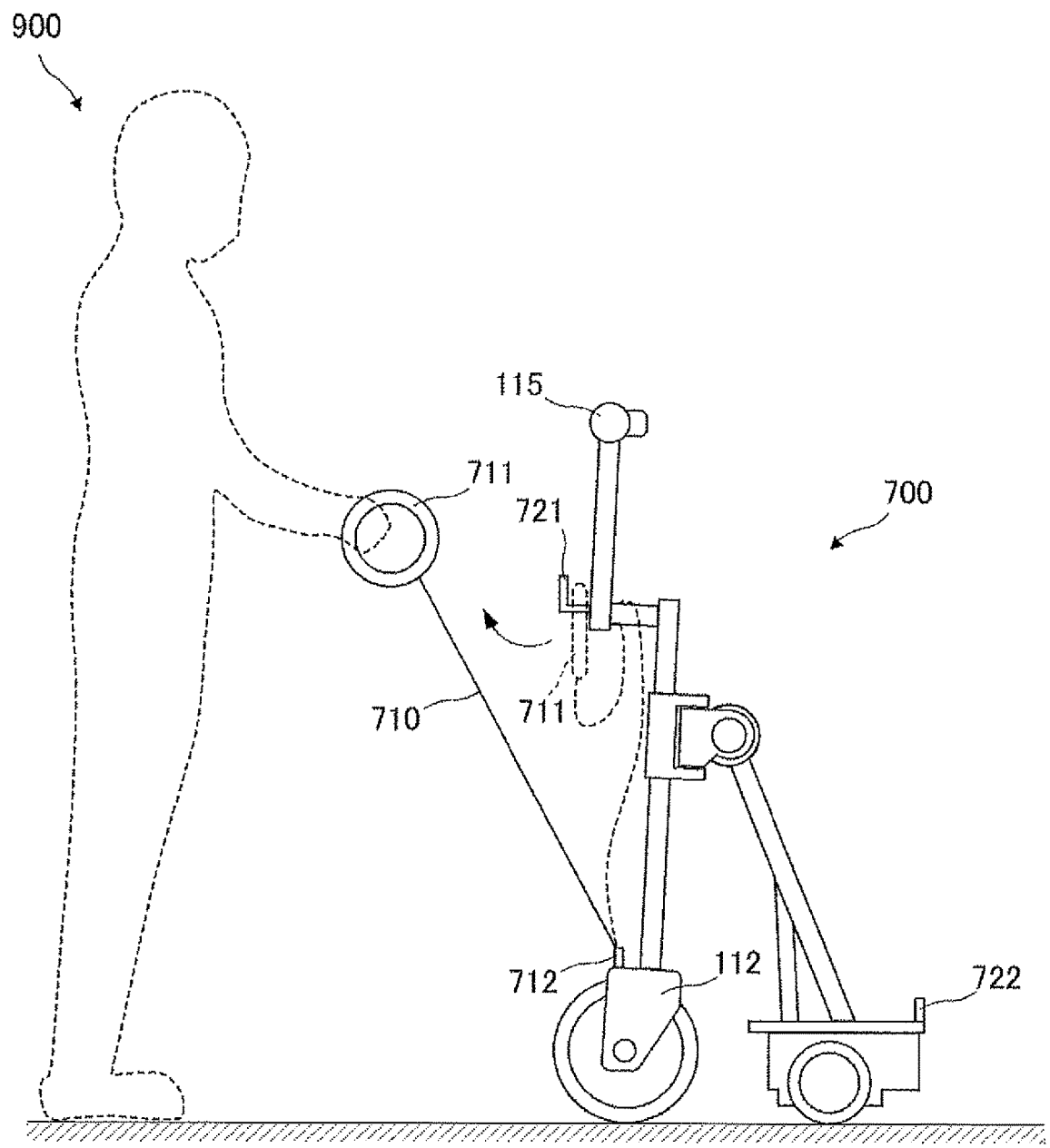
FIG. 14 is a lateral overview diagram of a traveling apparatus according to a third exemplary embodiment.

Next, a third exemplary embodiment will be described. FIG. 14 is a lateral overview diagram of a traveling apparatus 700 according to the third exemplary embodiment. In addition to the elements constituting the traveling apparatus 100 of the first exemplary embodiment, the traveling apparatus 700 further includes an additional function used by the user 900 when he or she gets off the traveling apparatus 700. As the traveling apparatus 700 has, in principle, all the elements and functions included in the traveling apparatus 100, only elements and functions related to the additional function will be described in this example.

The traveling apparatus 700 includes a towing cord 710 that is secured to a securing part 712, one end of the towing cord 710 is provided on the fork 112. The towing cord 710 is formed of a cord member such as a wire or a chain. The towing cord 710 includes an annular holding ring 711 at the other end of the towing cord 710 for the user 900 to easily hold the towing cord 710. When the towing cord 710 is not towed by the user 900, as illustrated by the dotted line, the towing cord 710 is placed with the holding ring 711 hanging on a latching hook 721 that is disposed near the handlebar 115. A coupling hook 722 is further included at a rear end of the body part 122.

When the user 900 gets off the traveling apparatus 700 and carries it to a parking place, he or she can pull the towing cord 710 to move the traveling apparatus 700. The traveling apparatus 700 is a statically stable vehicle that is self-supported by one front wheel 101 and two rear wheels 102, and follows the user 900 when the user 900 pulls the towing cord 710 in the pulled direction.

In the traveling apparatus 700, as the front wheel supporting member 110 and rear wheel supporting member 120 that are biased toward each other by the biasing spring 133 are configured to rotate around the hinge axis $H_4$, the angle formed by the front wheel supporting member 110 and rear wheel supporting member 120 varies according to a force of the user 900 to pull the towing cord 710, thereby changing the WB length. As has been described in the first exemplary embodiment, as the speed is associated with the rotation angle θ, which is the angle formed by the front wheel supporting member 110 and rear wheel supporting member 120, when the user 900 adjusts the pulling force to pull the towing cord 710, the user 900 can make the traveling apparatus 700 self-travel in the direction pulled by the user 900 and also adjust the speed of the traveling apparatus 700.

Additionally, as the towing cord 710 is a cord member, when the user 900 pulls the traveling apparatus 700 while walking, if the speed of the traveling apparatus 700 increases, to begin to catch up with the user 900, the towing cord 710 is slackened. When the towing cord 710 is slackened, the towing force is not transmitted to the front wheel supporting member 110, and thus the rotation angle θ is reduced by the action of the biasing spring 133. That is, the speed of the traveling apparatus 700 is automatically reduced. Accordingly, the user 900 can make the traveling apparatus 700 follow him or her comfortably by a small force even when the traveling apparatus 700 is heavy.

Figure 15:
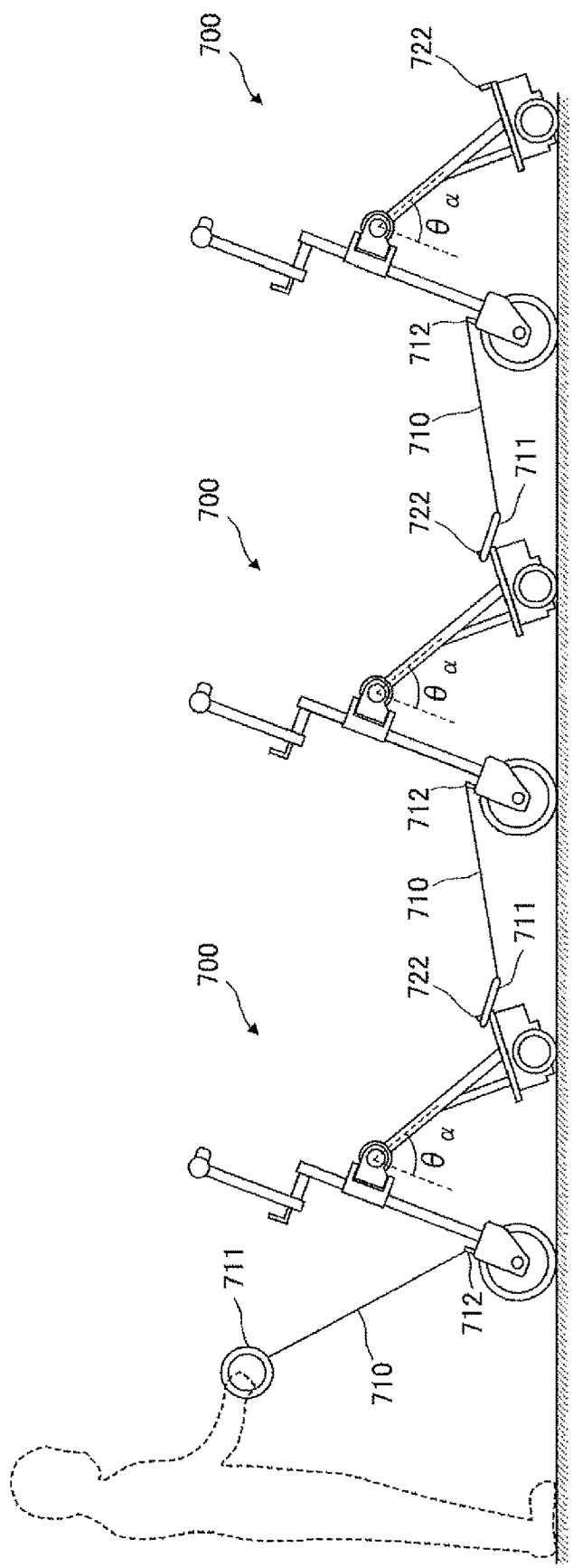
FIG. 15 is a drawing showing a state in which a plurality of the traveling apparatuses of FIG. 14 are coupled and towed.

FIG. 15 is a drawing showing a state in which a plurality of the traveling apparatus 700 are coupled and towed. As mentioned above, the traveling apparatus 700 includes the coupling hook 722 at the rear end of the body part 122. When the user 900 hooks the holding ring 711 of the following traveling apparatus 700 on the coupling hook 722 of the preceding traveling apparatus 700, the two traveling apparatuses 700 can be coupled by the towing cord 710. Likewise, three or four traveling apparatuses 700 can be coupled. FIG. 15 shows a state when three traveling apparatuses 700 are coupled.

When the user 900 pulls the holding ring 711 of the leading traveling apparatus 700, the plurality of coupled traveling apparatuses 700 can be collectively moved. As each of the towing cords 710 coupling the two travelling apparatuses 700, preceding and following traveling apparatuses 700, is subject to, in principle, the same pulling force, the rotation angles θα of the traveling apparatuses 700 will be the same angle, and thus the moving speeds of the coupled traveling apparatus 700 will also be the same. Even when the pulling forces differ from one another due to bumps and the like on the road, the following vehicle with an increased rotation angle θ speeds up, to begin to catch up with the preceding vehicle, while the preceding vehicle with a reduced rotation angle θ reduces the speed to wait for the following vehicle to catch up with the preceding vehicle. Thus, the speed of the coupled traveling apparatuses 700 as a whole in such a case is automatically adjusted.

Figure 16:
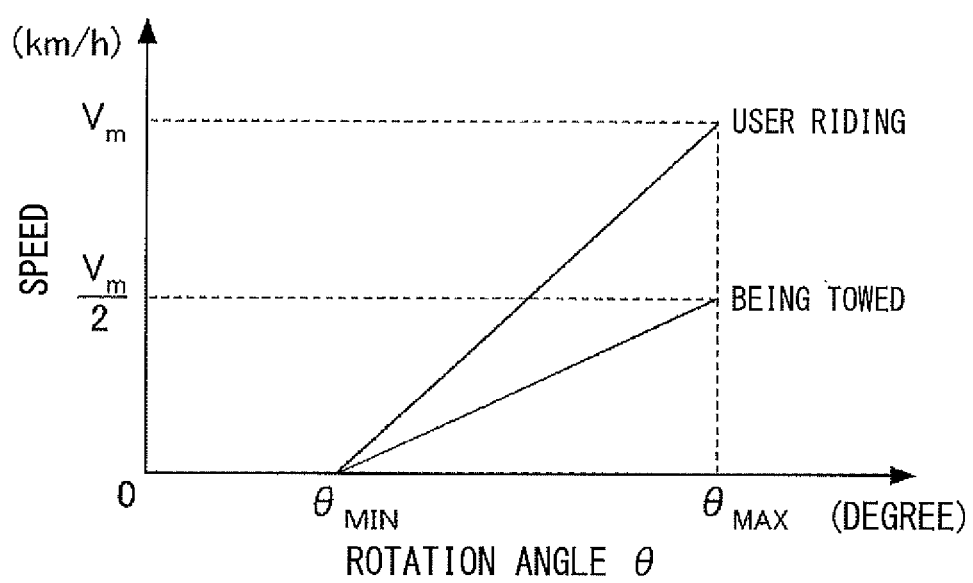
FIG. 16 is a graph showing a relationship between the rotation angle and the target speed.

FIG. 16 is a graph showing a relationship between the rotation angle θ and target speed to be applied to the traveling apparatus 700. When the user 900 pulls the towing cord 710 to move the traveling apparatus 700, it is considered that there are many cases where a user 900 wants to move the traveling apparatus 700 at a speed relatively slower than that of the traveling apparatus 700 when he or she rides on it to travel. For this reason, the target speed associated with the rotation angle θ when the traveling apparatus 700 is towed by the towing cord 710 is configured not to exceed the target speed of the traveling apparatus 700 when the user 900 rides on it to travel. The example shown in FIG. 16 is such an example.

As shown in FIG. 16, if the association between the rotation angle θ and target speed is configured to linearly change at $V_m$ (km/h) from zero within the range of $\theta_{MIN}$ to $\theta_{MAX}$ (degree), the association between the rotation angle θ and target speed is configured to linearly change at $V_m/2$ (km/h) from zero within the above-mentioned range. That is, a slope of the linear function is set to ½. By determining the association in this way, for example, when the user 900 gets off and then tows the traveling apparatus 700 to move it to a parking space, handling of the traveling apparatus 700 is made easy.

The association between the rotation angle θ and target speed is not limited to the example of FIG. 16, and various other associations may be formed. As in the example of FIG. 6, when the continuously varying rotation angle θ is divided into a plurality of groups, and one target speed is associated with each group, the speed zero may be associated with a group of rotation angle θ in the smallest range between $\theta_{MIN}$ or greater and less than $\theta_1$. In order to configure the target speed in such a way that it will not exceed the target speed of the traveling apparatus 700 when the user rides on it to travel, the speed of the traveling apparatus 700 when it is towed may be constant regardless of the rotation angle θ. Alternatively, like the first exemplary embodiment, the conversion table for associating the WB length with the target speed may be employed.

In the third exemplary embodiment thus described, although the traveling apparatus 700 employs the structure that it is towed by the towing cord 710, it is not limited to a cord member, and instead various operation members may be employed as long as they allow the user 900 to adjust the WB length while he or she is not riding on the traveling apparatus 700. For example, the operation member may be a ring or handle. Moreover, a position where the operation member is mounted is not limited to the fork 112, and instead, for example, it may be directly mounted on the rotation axis of the front wheel 101. Additionally, the traveling apparatus 700 is not limited to being towed, and instead may be pushed from behind. For example, a pressing-down lever extending rearward from the front pole 111 may be provided, and when the user 900 gets off the traveling apparatus 700 and pushes the lever forward while pressing it down from behind, the WB length may be increased. Alternatively, it may be possible to employ a configuration in which a force sensor that detects a force exerted on a towing member to pull the traveling apparatus 700 is included, and the WB length is adjusted according to the magnitude of the force. Such a configuration may be applied to the traveling apparatus 600 of the second exemplary embodiment. In this case, the traveling apparatus 600 is accelerated or decelerated according to the towing force detected by the force sensor. Therefore, in addition to the conversion table 251, a table for associating the towing force with the WB length or a table for associating the towing force with acceleration/deceleration may be prepared in advance.

Figure 17A:
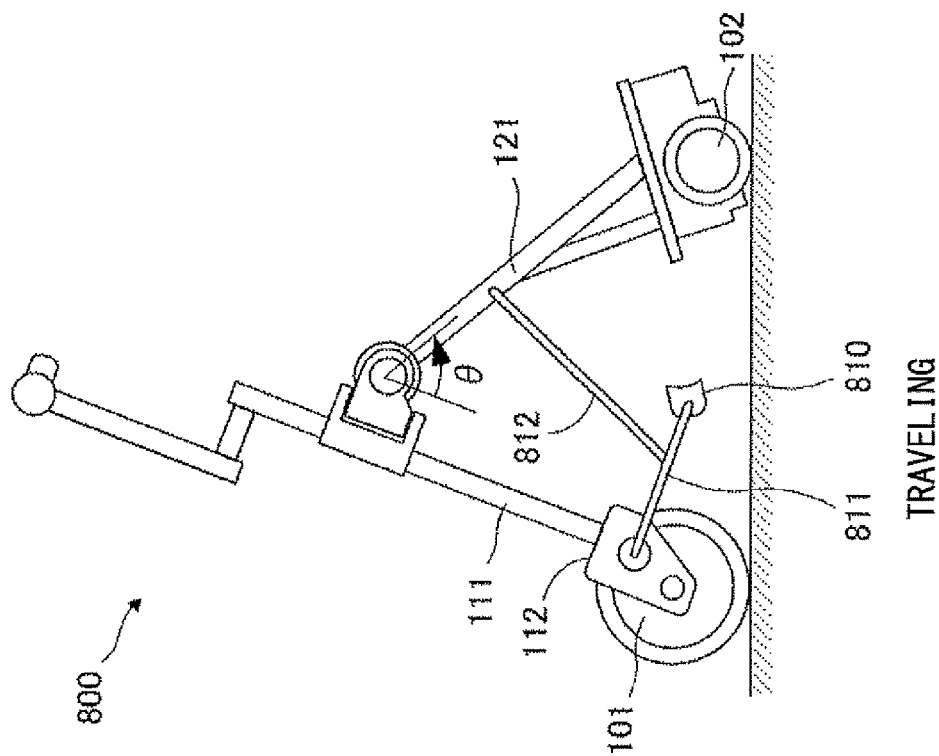
FIGS. 17A and 17B are lateral overview diagrams of the traveling apparatus according to a fourth exemplary embodiment.
Figure 17B:
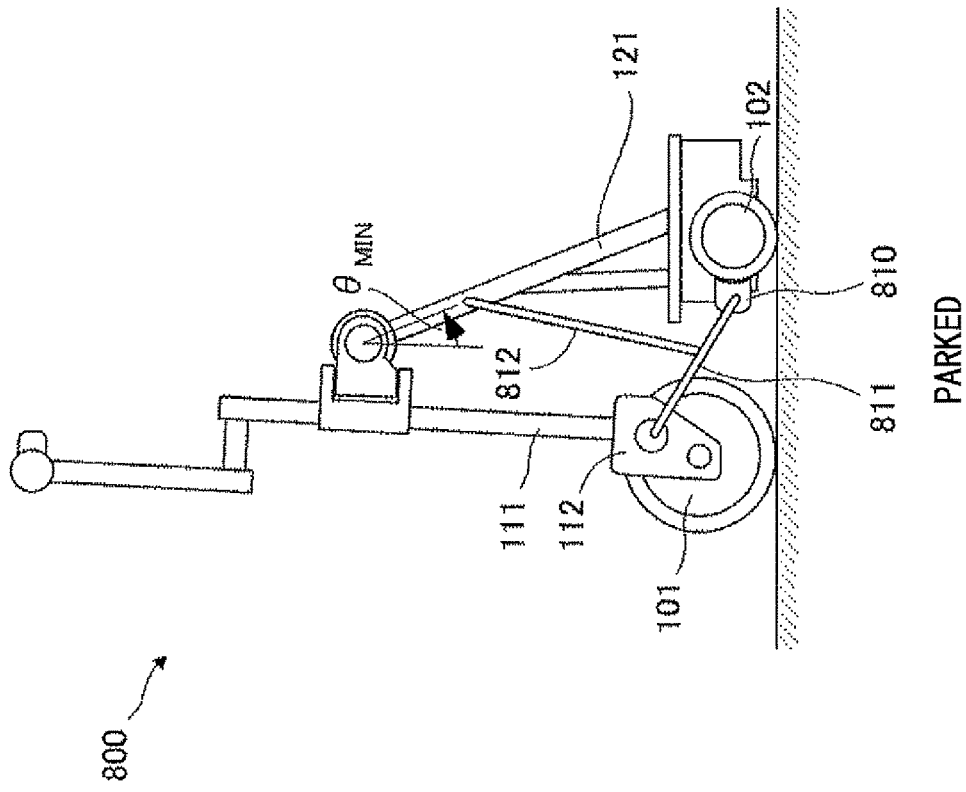

Next, a fourth exemplary embodiment will be described. FIGS. 17A and 17B are lateral overview diagrams of a traveling apparatus 800 according to the fourth exemplary embodiment. FIG. 17A shows a state when the traveling apparatus 800 is parked, and FIG. 17B shows a state when the traveling apparatus 800 travels. In addition to the elements constituting the traveling apparatus 100 of the first exemplary embodiment, the traveling apparatus 800 further includes an additional function for a parked state. As the traveling apparatus 800 has, in principle, all the elements and functions included in the traveling apparatus 100, only elements and functions related to the additional function will be described in this example.

The traveling apparatus 800 includes a supporting bar 811 and a link bar 812 that constitute, together with the front pole 111 and rear pole 121, nodes of the link mechanism. One end of the supporting bar 811 is rotatably supported by the fork 112, and one end of the link bar 812 is rotatably supported by the rear pole 121. The other end of the link bar 812 is rotatably supported by the supporting bar 811 at about the middle of the supporting bar 811. With such a link mechanism, when the rotation angle θ, which is the angle formed by the front pole 111 and rear pole 121, increases, an angle formed by the supporting bar 811 and link bar 812 also increases.

A stopper 810 is fixed to the other end of the supporting bar 811. The stopper 810 is brought into contact with a rotation surface of the rear wheel 102 when the rotation angle θ is the smallest, $\theta_{MIN}$. A contacting surface of the stopper 810 that is brought into contact with the rotation surface of the rear wheel 102 is made of a member having a high friction coefficient (e.g., rubber member). As a result, when the traveling apparatus 800 is parked, the stopper 810 is brought into contact with the rotation surface of the rear wheel 102 to prevent the rear wheels 102 from rotating. In other words, the traveling apparatus 800 is less likely to undesirably move while being parked when swayed by the wind. Moreover, as the stopper 810 is separated from the rear wheel 102 by the action of the link mechanism while the traveling apparatus 800 is traveling, the stopper 810 will not be an obstacle for the traveling apparatus 800 when it travels. Furthermore, as the traveling apparatus including the stopper 810 does not consume power, it is advantageous over the apparatus that uses an electromagnetic brake to prevent rotation of the wheels.

In the above example, although the structure in which the stopper 810 is brought into contact with the rotation surface of the rear wheel 102 by the link mechanism has been employed, a specific configuration is not limited to this. A stopper with any configuration may be employed as long as it is brought into contact with a rotation element in such a way as to control the rotation of at least one of the front wheel 101 and rear wheels 102 in conjunction with the operation of the adjusting mechanism for reducing the WB length. For example, another stopper may be disposed on a leading end of the link bar 812, and the stopper may be brought into contact with a rotation surface of the front wheel 101 when the traveling apparatus 800 is parked. Moreover, the stopper is not limited to the one that prevents the rotation by a frictional force and instead may be one in which, for example, a rotation preventing pin may be projected from the front wheel supporting member 110, and when the rotation angle is $\theta_{MIN}$, the rotation preventing pin is inserted into an engaging hole provided in the wheel axis 103 in order to prevent the rotation of the wheel axis 103. These stoppers prevent the wheels from rotating by maintaining the contact with the rotating element(s) related to the wheels while the traveling apparatus 800 is parked.

Moreover, it may be possible to include another stopper that is brought into contact with a traveling surface of the wheels in conjunction with the operation of the adjusting mechanism for reducing the WB length. When such a configuration is employed, for example, in the example of FIG. 17A, the stopper 810 may be mounted on the other end of the supporting bar 811 downwardly (facing the road surface). At this time, the contacting surface of the stopper 810 to be in contact with the road surface is preferably parallel to the road surface.

Further, although the traveling apparatus 800 is based on the traveling apparatus 100, it may be based instead on the traveling apparatus 600 with functions similar to those of the traveling apparatus 800 further included therein. For example, the traveling apparatus 800 may employ the configuration in which a stopper is brought into contact with the front wheel 101 in conjunction with the extending and retracting motion of the extensible rod 610.

Although the exemplary embodiments have been described, if the additional functions described in the third and fourth exemplary embodiments are not included, the traveling apparatus may not be a stationary stable vehicle that is self-supported. The traveling apparatus of the first and second exemplary embodiments can be implemented by including, with respect to the traveling direction, at least front and rear wheels. Moreover, the front and rear wheels may not be wheels and may instead be ground-contacting elements such as spherical wheels, a crawler, or the like. Further, the traveling apparatus may not be configured to be steered by turning the handlebar, and instead may be configured to be steered by the user 900 shifting his or her weight. Moreover, a power source for driving the driving wheels is not limited to a motor and instead may be a gasoline engine or the like.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A traveling apparatus including at least, with respect to a traveling direction, a front wheel and a rear wheel and on which a user rides when travelling, the traveling apparatus comprising:
 a front wheel supporting member configured to rotatably support the front wheel;
 a rear wheel supporting member configured to rotatably support the rear wheel;
 an adjusting mechanism configured to adjust a wheel base length between the front wheel and the rear wheel by changing a relative position of the front wheel supporting member and the rear wheel supporting member;
 a driving unit configured to drive at least one of the front wheel and rear wheel, wherein the wheel base length adjusted by the adjusting mechanism is associated with a speed of the traveling apparatus achieved by driving the driving unit in such a way that the longer the wheel base length, the greater the speed becomes, and when one of values of the wheel base length and the speed is changed by an operation of the user, the other one of the values is controlled to be a value associated with the changed one of the values; and
 a control unit configured to, when the wheel base length is adjusted by the user operating the adjusting mechanism, drive the driving unit at the speed associated with the adjusted wheel base length, the speed being a target speed.

2. The traveling apparatus according to claim 1, wherein
 the front wheel supporting member includes a handlebar for the user to hold,
 the rear wheel supporting member includes a step for the user to ride on,
 the adjusting mechanism includes a hinge that rotates the front wheel supporting member and the rear wheel supporting member in relation to each other,
 the user adjusts the wheel base length by changing at least one of a weight on the handlebar and a weight on the step to thereby rotate the front wheel supporting member and the rear wheel supporting member in relation to each other around the hinge.

3. The traveling apparatus according to claim 2, wherein
 the adjusting mechanism includes a biasing member that biases the front wheel supporting member and the rear wheel supporting member in a direction to reduce a relative angle, and
 the wheel base length, when the relative angle is made smallest by an action of the biasing member, is associated with the speed zero.

4. The traveling apparatus according to claim 1, wherein
 the traveling apparatus can be self-supported by a ground-contacting member including the front wheel and the rear wheel, and
 the traveling apparatus further comprises an operation member configured to allow the user to operate the adjusting mechanism while he or she is not riding on the traveling apparatus and to adjust the wheel base length.

5. The traveling apparatus according to claim 4, wherein
 the operation member comprises a cord member, one end of which is attached to the front wheel supporting member, and another end of which is towed by the user, and
 the rear wheel supporting member comprises a latching part for latching the other end of the cord member of another traveling apparatus.

6. The traveling apparatus according to claim 4, wherein
 an association between the wheel base length and the speed when the wheel base length is adjusted without using the operation member differs from an association between the wheel base length and the speed when the wheel base length is adjusted using the operation member, and
 the association is formed in such a way that the speed at which the wheel base length is adjusted using the operation member will not exceed the speed at which the same wheel base length is adjusted without using the operation member.

7. The traveling apparatus according to claim 1, further comprising a stopper configured to be brought into contact with a rotation element in conjunction with an operation of the adjusting mechanism for reducing the wheel base length in such a way as to control rotation of at least one of the front wheel and the rear wheel, wherein
 the stopper maintains the contact with the rotation element while the traveling apparatus is parked.

8. The traveling apparatus according to claim 1, further comprising a stopper configured to be brought into contact with a traveling surface in conjunction with an operation of the adjusting mechanism for reducing the wheel base length in such a way as to control rotation of at least one of the front wheel and the rear wheel, wherein
 the stopper maintains the contact with the traveling surface while the traveling apparatus is parked.

* * * * *